No. 667,303. Patented Feb. 5, 1901.
G. R. EVANS.
TRAP.
(Application filed Nov. 21, 1900.)
(No Model.)
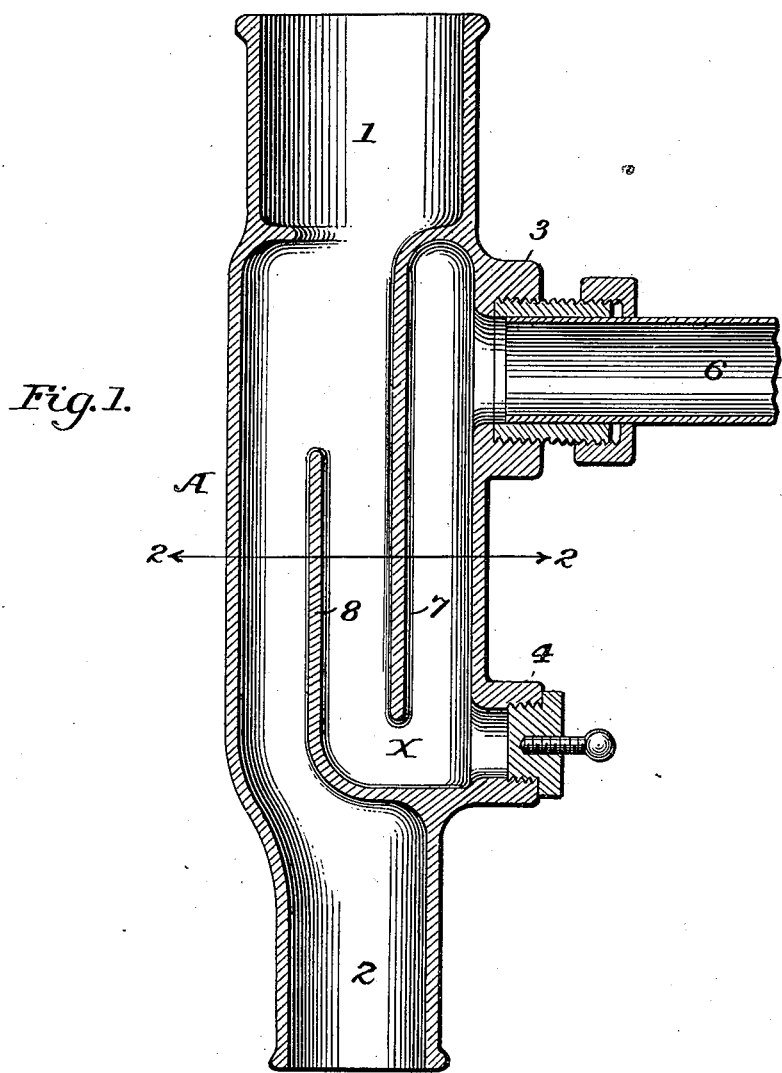
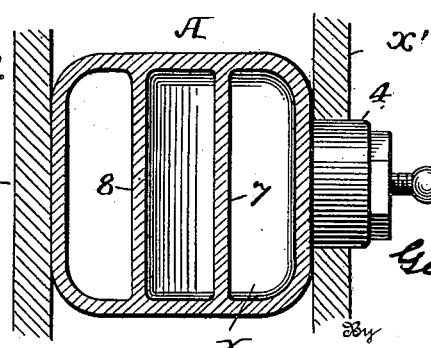
Witnesses
J. G. Hinkel
H. M. Gillman, Jr.
Inventor
George R. Evans
By
Foster Freeman
Attorneys
THE NORRIS PETERS CO., PHOTO-LITHO., WASHINGTON, D. C.

UNITED STATES PATENT OFFICE.

GEORGE RUTHERFORD EVANS, OF FRESNO, CALIFORNIA.

TRAP.

SPECIFICATION forming part of Letters Patent No. 667,303, dated February 5, 1901.

Application filed November 21, 1900. Serial No. 37,283. (No model.)

*To all whom it may concern:*

Be it known that I, GEORGE RUTHERFORD EVANS, a citizen of the United States, residing at Fresno, in the county of Fresno and State of California, have invented certain new and useful Improvements in Traps, of which the following is a specification.

My invention relates to traps for use in connection with washbasins, sinks, &c., and more especially to that class which it is desired to insert in partitions; and my invention consists of a trap so constructed as to give an easy and quick access to the trap in case of stoppage, to bring it into the smallest practicable compass, so that it can be concealed within an ordinary four-inch partition, and to present a neat appearance under the washstand or wherever it may have to be exposed; and to these ends I construct the trap as fully set forth hereinafter and as illustrated in the accompanying drawings, in which—

Figure 1 is a longitudinal sectional elevation of a trap embodying my invention. Fig. 2 is a transverse section on the line 2 2, Fig. 1.

The vessel A may be of any suitable size and proportion; but preferably it is intended for a partition-trap—that is, to lie within the compass of an ordinary partition—and is greater in length than in thickness, the latter being sufficient to permit the trap to occupy the space between the lathing and opposite side of the partition. At the upper end of the vessel is a neck 1, adapted for attachment to a vent-pipe, and at the lower end is a neck 2, adapted for attachment to the usual discharge-pipe. At one side of the vessel A are generally two necks 3 4, one above the other and projecting outward, so as to extend through one side of the partition into the room where the basin is to be placed. The upper neck 3 is internally threaded or otherwise constructed for application or attachment to the basin waste-pipe 6, while the lower neck (which in some cases may be dispensed with) is, if used, internally threaded to receive a screw-plug 5, which may be detached for the purpose of cleaning the trap. Within the vessel is a longitudinal partition 8, which occupies a position nearly midway between the sides of the vessel—that is, between the front and back—and is parallel to said sides and at the bottom is extended forward to the front or outside of the vessel, thereby forming a cup X. A second partition 7 extends from the outer side of the vessel inward and is parallel to the partition 8, but about midway between the latter and the outer side of the vessel, the lower edge extending at such a distance from the bottom of the cup as to form a proper trap therewith, receiving the fluid from the basin and effectually sealing the channel.

The trap as thus constructed will in use be inserted in a partition between the walls X X' thereof and will be concealed by the lathing and plaster at one side, through which the neck or necks 3 4 project, the upper end being connected to the vent-pipe and the lower end of the vessel being connected to the discharge-pipe, as usual.

It will be seen that the said trap affords an excellent opportunity for thorough ventilation, inasmuch as any vapors from the sewer-pipe can escape directly upward through the trap without being deflected and without any tendency to enter the room or to displace the contents of the cup X. It will further be seen that the upward flow of gases from the sewer, in case the contents of the cup should become discharged or evaporate, will tend to exert a suction action, drawing the air from the room and through the trap instead of tending to discharge it into the room.

Without limiting myself to the precise construction and arrangement of parts shown, I claim as my invention—

1. A trap consisting of a vessel A open at the upper and lower ends, a cup formed within and at one side of the vessel, a partition extending from that side of the vessel from above and downward into the cup, and a hollow inlet-neck projecting outward from the side of the vessel below the top of the partition and above the top of the cup, substantially as set forth.

2. A trap consisting of a vessel open at the ends and with a hollow neck 3 at one side to receive the inlet-pipe, and provided with longitudinal separated partitions, the outer partition extending at the top to the side of the vessel above said neck, and the inner partition extending to the same side of the vessel below the lower end of the other partition, substantially as set forth.

3. A partition-trap consisting of a vessel with necks at the upper and lower ends, a cup within and at one side of the vessel, a partition extending from that side of the vessel downward but not to the bottom of the cup, an inlet-opening in the side of the vessel opposite the partition and above the cup, substantially as set forth.

4. A partition-trap consisting of a vessel with necks at the upper and lower ends, a cup within and at one side of the vessel, a partition extending from that side of the vessel downward but not to the bottom of the cup, an inlet-opening in the side of the vessel opposite the partition and above the cup, and a discharge-opening provided with a plug in the side of the vessel near the bottom of the cup, substantially as set forth.

5. A trap consisting of a vessel having necks at the ends, and two necks at different heights at one side, a partition extending from one side above the upper side neck and downward, another partition extending from the side of the vessel below the lower side neck and upward and forming a cup, substantially as set forth.

6. A trap consisting of a vessel open at the upper and lower ends and provided with necks at one side, one above the other, and two longitudinal separated parallel partitions, one extending from the side of the vessel having the necks and downward past the other partition, and the latter extending at the lower end outward to the side of the vessel below the lower neck, substantially as set forth.

In testimony whereof I have signed my name to this specification in the presence of two subscribing witnesses.

GEORGE RUTHERFORD EVANS.

Witnesses:
WINGHAM LIDDELL,
CHAS. W. BARRETT.